United States Patent
Cifarelli (10) Patent No.: US 8,571,331 B2
(45) Date of Patent: Oct. 29, 2013

(54) CONTENT BASED IMAGE SELECTION FOR AUTOMATIC PHOTO ALBUM GENERATION

(75) Inventor: Claudio Cifarelli, Rome (IT)

(73) Assignee: Xerox Corporation, Norwalk, CT (US)

( * ) Notice: Subject to any disclaimer, the term of this patent is extended or adjusted under 35 U.S.C. 154(b) by 857 days.

(21) Appl. No.: 12/627,054

(22) Filed: Nov. 30, 2009

(65) Prior Publication Data

US 2011/0129159 A1 Jun. 2, 2011

(51) Int. Cl.
*G06K 9/64* (2006.01)

(52) U.S. Cl.
USPC .......................................... 382/224; 382/225

(58) Field of Classification Search
USPC ................................................ 382/224, 225
See application file for complete search history.

(56) References Cited

U.S. PATENT DOCUMENTS

| | | | |
|---|---|---|---|
| 8,121,358 B2 * | 2/2012 | Weng et al. .................... | 382/118 |
| 8,189,880 B2 * | 5/2012 | Wen et al. ...................... | 382/118 |
| 2002/0085762 A1 | 7/2002 | Shniberg et al. | |
| 2005/0071781 A1 | 3/2005 | Atkins | |
| 2005/0071783 A1 | 3/2005 | Atkins | |
| 2005/0129334 A1 | 6/2005 | Wilder et al. | |
| 2005/0220327 A1 * | 10/2005 | Itoh et al. ...................... | 382/124 |
| 2006/0103891 A1 | 5/2006 | Atkins | |
| 2006/0150092 A1 | 7/2006 | Atkins | |
| 2006/0153460 A1 * | 7/2006 | Kim et al. ...................... | 382/225 |
| 2006/0193538 A1 * | 8/2006 | Vronay et al. ................. | 382/305 |
| 2006/0200758 A1 | 9/2006 | Atkins | |
| 2006/0279566 A1 | 12/2006 | Atkins et al. | |
| 2006/0280427 A1 * | 12/2006 | Snowdon et al. ............... | 386/46 |
| 2007/0078846 A1 * | 4/2007 | Gulli et al. ...................... | 707/5 |
| 2008/0021899 A1 * | 1/2008 | Avidan et al. ...................... | 707/6 |
| 2008/0085055 A1 * | 4/2008 | Cerosaletti et al. ............ | 382/225 |
| 2008/0089593 A1 * | 4/2008 | Ohwa .......................... | 382/225 |
| 2008/0205772 A1 * | 8/2008 | Blose et al. ................... | 382/225 |
| 2008/0232697 A1 * | 9/2008 | Chen et al. .................... | 382/225 |
| 2010/0008570 A1 * | 1/2010 | Urashima ..................... | 382/165 |
| 2010/0226584 A1 * | 9/2010 | Weng et al. ................... | 382/225 |

OTHER PUBLICATIONS

Platt, AutoAlbum: Clustering Digital Photographs using Probabilistic Model Merging, IEEE, 2000, pp. 1-6.*
Ester, M., H. P. Kriegel, X. Xu, A density-based algorithm for discovering clusters in large databases with noise. Proceedings of 2nd ACM SIGKDD, Portland, Oregon, 1996, pp. 226-231.

* cited by examiner

*Primary Examiner* — John Strege
(74) *Attorney, Agent, or Firm* — Fay Sharpe LLP (57) ABSTRACT

A method is employed to present image from an event. A plurality of images from the event are received and one or more clusters of images are created, wherein each cluster of images has a similarity greater than a predetermined threshold. A density value of the data distribution within each cluster is estimated and at least one local maximum associated with each cluster is identified via a density function. At least one image from each cluster is selected, wherein each image is a candidate for the presentation. A layout is created to present the images selected.

19 Claims, 8 Drawing Sheets

| CLASS | FULL | HALF | SMALL |
|---|---|---|---|
| GROUP OF PEOPLES | ✓ | ✓ | |
| SMALL GROUPS OF PEOPLES | ✓ | ✓ | |
| PORTRAIT | ✓ | ✓ | |
| CLOSE-UP | ✓ | | ✓ |
| BUILDINGS | | | ✓ |
| LANDSCAPE | ✓ | ✓ | ✓ |

CONTENT BASED IMAGE SELECTION FOR AUTOMATIC PHOTO ALBUM GENERATION

BACKGROUND

This application generally relates to the automatic generation of photo albums. In one particular application, image data sets are created by identifying similar images associated with peak moments of an event. It is to be appreciated, however, that the present exemplary embodiment is also amenable to other like applications.

The number of photographs taken during a special event such as a holiday, a birthday, an anniversary, etc. is generally very large as attendees can capture multiple images (e.g., via a digital camera) during significant moments. To obtain a coherent collection, each attendee's images can be merged into a single compilation. As a finite number of moments occur per event, the number of similar images increases when utilizing images captured by multiple attendees.

Accordingly, one goal of such a compilation is to obtain an overall representation of the event with images that are as non-repetitive as possible. Conventional systems and methods focus on automatic layout or information retrieval in events such as face detection and classification. In some instances, the selection algorithms are limited only to evaluation detection of participants utilizing discriminatory algorithms. None of these systems and methods, however, facilitates accurate automatic selection of one or more images for compilation.

Accordingly, there is a need for systems and methods to organize and automatically select images related to a common event based on a wide range of factors.

BRIEF DESCRIPTION

In one aspect, a method is employed to present image from an event. A plurality of images from the event are received and one or more clusters of images are created, wherein each cluster of images has a similarity greater than a predetermined threshold. A density value of the data distribution within each cluster is estimated and at least one local maximum associated with each cluster is identified via a density function. At least one image from each cluster is selected, wherein each image is a candidate for the presentation. A layout is created to present the images selected.

In another aspect, a method is utilized to provide a representative compilation of images from an event. A plurality of images captured at the event are received. A density estimation for the data distribution is computed and one or more candidates of representative images are detected, wherein each candidate has a density estimation greater than a predetermined threshold. Images from the one or more candidates are selected for presentation within a layout.

In yet another aspect, a system identifies images for presentation within a compilation. An image data set contains a plurality of images wherein a similarity evaluator receives the image data set, determines a similarity score for each image relative to every other image within the data set and assigns each image to a cluster. A density estimator determines a density value of each image within each cluster. An image selector selects images from each cluster that have a density value greater than a predetermined threshold.

INCORPORATION BY REFERENCE

U.S. Patent Publication Number 2009/0144033, ADAPTED MIXTURE MODELS FOR IMAGE RETRIEVAL AND CATEGORIZATION by Yan Liu and Florent Perronnin is incorporated in its entirety herein by reference.

DETAILED DESCRIPTION

Figure 1:
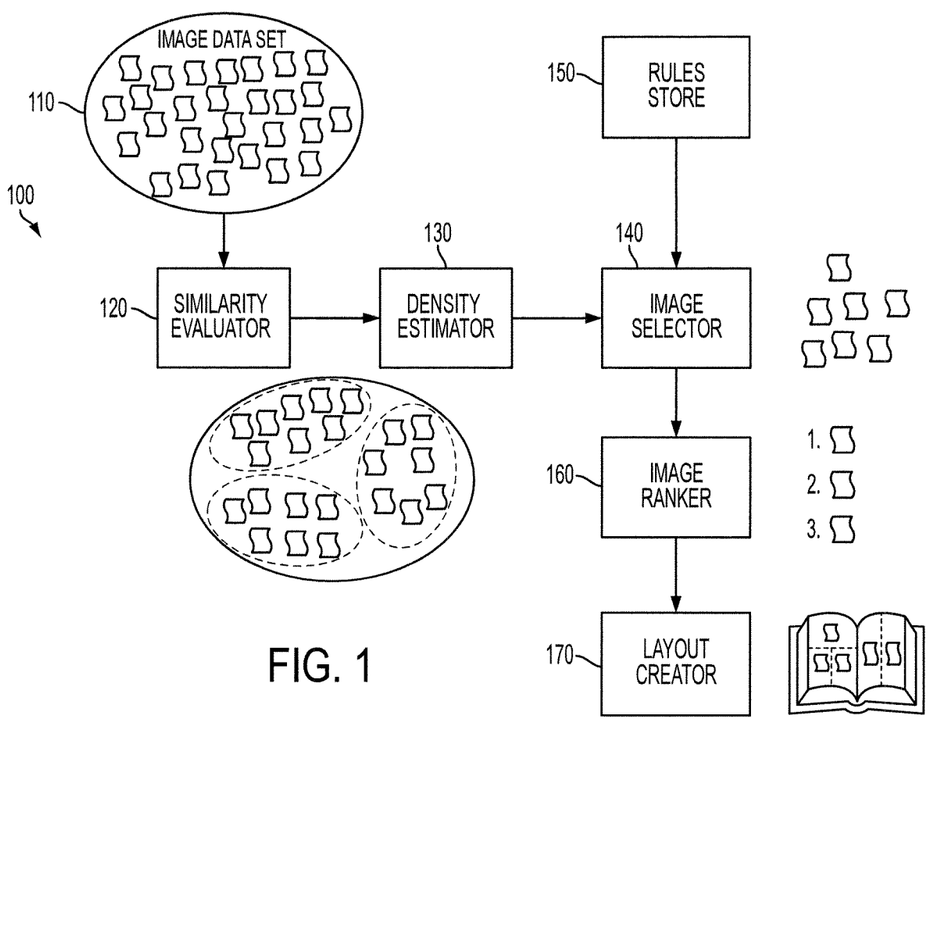
FIG. 1 illustrates a system that organizes images for presentation in a document, in accordance with an exemplary embodiment.

FIG. 1 illustrates a system 100 that receives an image data set 110, selects one or more images from the data set and creates a layout for the selected images. In one example, the image data set 110 is related to a common event wherein a plurality images are captured of disparate aspects at different times throughout the event. In another example, the image data set 110 has one or more common subsets of content, such as persons, places and/or objects. For instance, the image data set 110 can be created via a plurality of users, such as guests at a party or travelers on a trip. It is to be appreciated, however, that the data set 110 can contain substantially any content and be captured at any time.

The images within the data set 110 can be captured via a camera, video camera, cell phone, PDA, or other digital image recording device. Alternatively or in addition, the image can be captured via an analog device and subsequently scanned into a digital format for use with the image data set 110. The image can be stored in substantially any protocol, standard or format such as a jpeg, bitmap, gif, jif, png, jng, mng, tif, xif, targa, afi, pix, bpx, psd, pdd, pcd, wmf, palm, pal, pcl, pict, pix, pwp, sun, svg, ttf, vicar, vic, viff, vif, xbm, xcf, xpm, avi, mpeg, mpe, mpg, wmv, etc. Further, each image can include enhancements made subsequent to capture via image editing tools to modify attributes such as color, tint, hue, brightness, etc.

The image data set 110 can be stored on storage media that includes volatile and nonvolatile memory, removable and non-removable media implemented in any method or technology for storage of information such as computer readable instructions, data structures, program modules or other data. Storage media can include, but is not limited to, RAM, ROM, EEPROM, flash memory or other memory technology, CD-ROM, digital versatile disks (DVD) or other magnetic storage devices, or any other medium which can be used to store the image data set 110.

A similarity evaluator 120 receives the image data set 110. The similarity evaluator 120 evaluates the similarity between images to determine if such images contain redundant content. In one example, the algorithm compares two images at a time within the data set 110. A plurality of iterations of comparisons can be performed to eliminate redundant content. In one example, an algorithm as described in U.S. patent application Ser. No. 11/947,859 entitled Adapted Mixture Models for Image Retrieval and Categorization, incorporated herein by reference, is utilized to measure the similarity of images within the data set 110. Images which are deemed to be greater than a predetermined threshold of similarity are clustered together for further processing.

A density estimator 130 receives the clustered images from the similarity evaluator 120 to ascertain the frequency of common elements of images within each cluster. In one example, the common elements are evaluated via a density function to provide an objective measurement of the density of common elements within each image. The local maxima of a density function can provide further information for selection of appropriate images to be placed in a layout. In one example, a k-nearest neighbor's algorithm is employed as a density function although substantially any method of instance learning can be employed. Such learning can include a k-most similar neighbor, a linear scan, a kd-tree, a ball-tree, a metric-tree, a locality sensitive hashing, an agglomerative-nearest-neighbor, and/or a redundant bit vector algorithm. Utilizing one or more of these algorithms, the density estimator 130 identifies local maxima within each cluster, wherein such maxima relate to particular images to be utilized in a particular layout. In this manner, representative images of disparate aspects of an event can be identified that contain non-repetitive content.

An image selector 140 receives the images and associated cluster and maxima information from the density estimator 130 to determine appropriate images for selection. Several factors can be employed such as quality of an image, a rating from one or more parties, a timeline consistency, a rating, etc. In one example, a single image is selected from each cluster (mode) of the density function. In this manner, the common elements are eliminated from each image such that there is one representative image for such elements. The images selected from each cluster can be compiled to provide a comprehensive compilation of moments from a given event.

The image selector 140 can employ a rules store 150 to determine selection of images. The rules store 150 can include a plurality of parameters that provide explicit guidance to include or reject an image. The metrics can be organized for use on the basis of an event type, a number of clusters of images, an expected similarity of images, etc. In this manner, the rules store 150 can accommodate selection of images regardless of the variables associated therewith.

In one example, metrics can be included that relate to image quality such as sharpness, exposure, contrast, format, etc. In one approach, the rules store can specify a quality threshold and a time range wherein the image is eliminated from selection if is not both greater than the quality threshold and within the time range. The rules store 150 can also include rating metrics that relate to the evaluation of each image by various individuals (e.g., attendees at a particular event). Ratings can be gathered directly and/or indirectly on the basis of downloads or clicks (e.g., via a web-based environment) and compiled for use downstream by the image selector 140 or other components within the system 100.

Accordingly, images can be ranked by one or more metrics including image quality, time line consistency and ratings as provided by one or more users. In one approach, an algorithm is utilized wherein lower quality images which are less than a predetermined quality are eliminated from the group of images provided by the image selector 140. Likewise, images that are outside of a predetermined time range are eliminated. The most highly rated images are put on the top of a list and ranked from top to bottom utilizing the combination of a rating provided by one or more users and/or downloads by the same group of individuals.

The layout creator 170 receives images ranked by the image ranker 160 and determines how to present the images within a given format. The layout creator 170 can analyze the characteristics of the image such as size, quality and time line in order to determine the location of the image within a hard copy compilation. Images can be presented in a number of formats as provided in FIG. 6 such as full page vertical, side by side, horizontal top and bottom and small and half size templates. A number of metrics can be utilized to make a decision as to how to place images within a page such as the image containing a group of people, a small group of people, a portrait, a close-up, a building and/or a landscape. Once this determination is made, the layout creator can present this data in a usable format such as a .pdf or other format for use by one or more third party image presentation systems.

Figure 8:
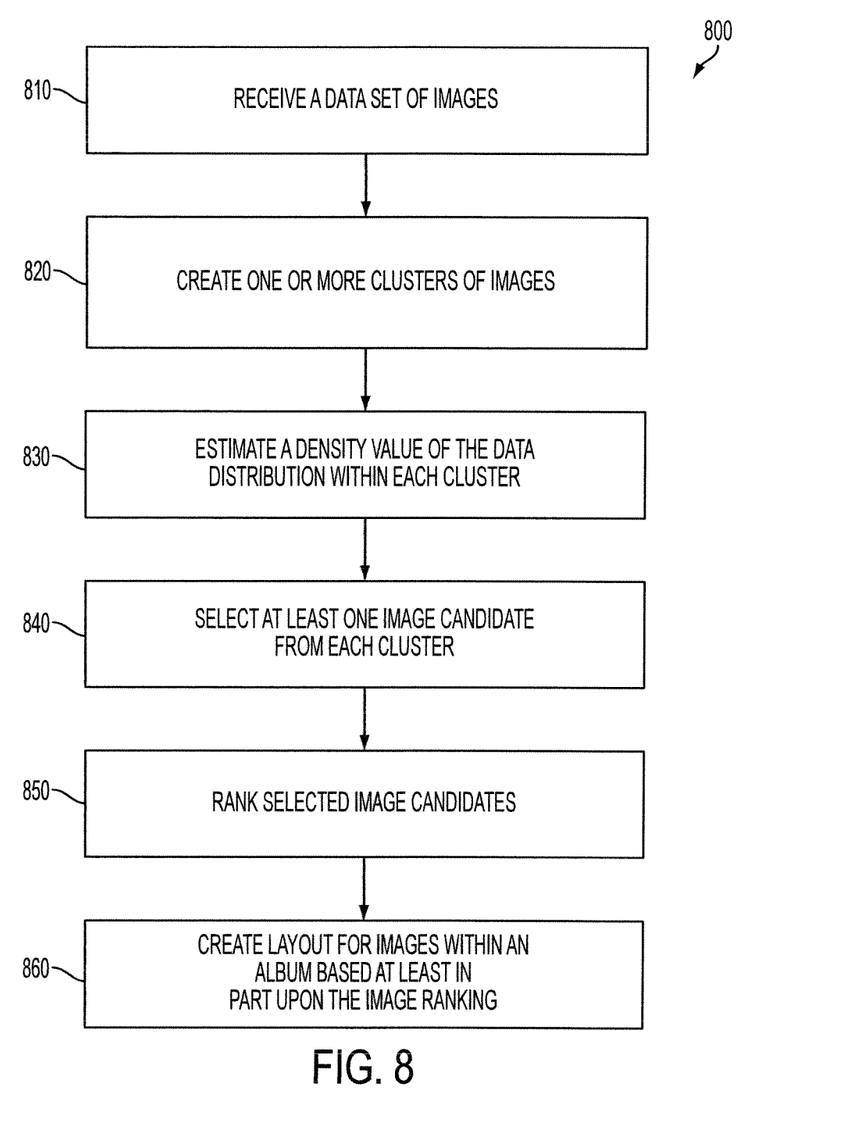
FIG. 8 illustrates a methodology to provide an event summarization, in accordance with an exemplary embodiment.

A computer 180 illustrates one possible hardware configuration to support the systems and methods described herein, including the system 100 and methodology 800 discussed herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 180 can include a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer 180 can further include a hard disk drive, a magnetic disk drive, e.g., to read from or write to a removable disk, and an optical disk drive, e.g., for reading a CD-ROM disk or to read from or write to other optical media. The computer 180 typically includes at least some form of computer readable media. Computer readable media can be any available media that can be accessed by the computer. By way of example, and not limitation, computer readable media may comprise computer storage media and communication media.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer 180 can be any of a number of commercially available operating systems.

A user may enter commands and information into the computer through a keyboard (not shown) and a pointing device (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc.

A monitor, or other type of display device, is also connected to the system bus via an interface, such as a video adapter (not shown). In addition to the monitor, a computer typically includes other peripheral output devices (not shown), such as speakers, printers etc. The monitor can be employed with the computer 180 to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer 180 via any wireless or hard wire protocol and/or standard.

The computer 180 can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Figure 2:
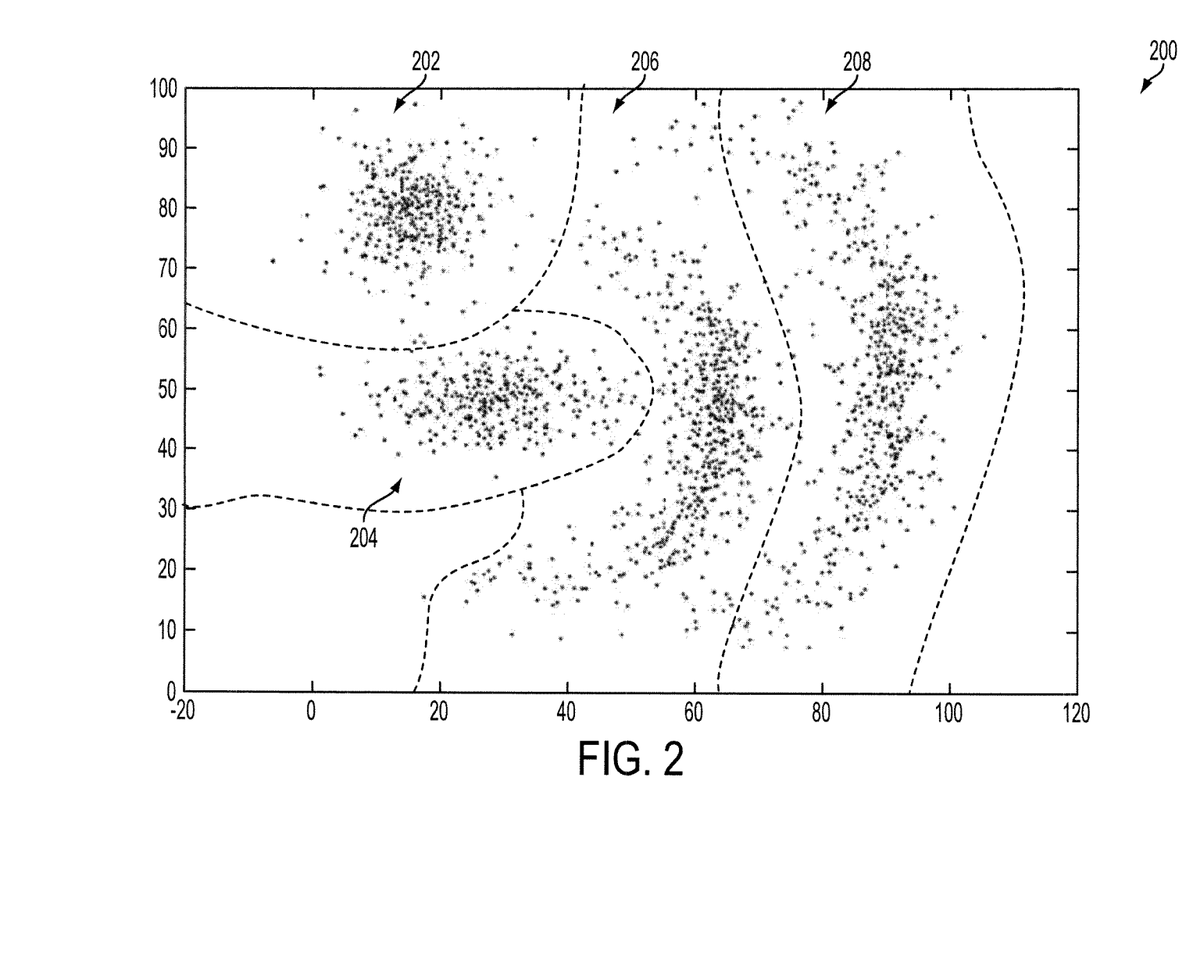
FIG. 2 illustrates an exemplary data set that relates to a plurality of images, in accordance with an exemplary embodiment.

FIG. 2 illustrates an exemplary data set 200 that includes a plurality of images captured at an event. The X and Y axis of the graph illustrating the data set 200 can be related to one or more metrics associated with each image. In one example, metrics relate to quality, time of capture and/or camera settings used for image capture. In another example, metrics relate to the content of each image such as colors, shapes, textures, or any other information that can be derived from the image itself. Metrics can be associated with each image in the form of metadata provided by a digital camera or equivalent image capturing device.

Content of each image can be discerned utilizing content-based image retrieval, query by image content, content-based visual information retrieval or other known algorithms. As utilized herein, "content-based" means that the actual contents of the image are analyzed. In one example, computer vision is employed to search and analyze image content. The content of each image can be itemized and catalogued for comparison to every other image within the data set 200.

The location of each image within the data set 200 is dependent on the metrics and/or content as set forth by the X and Y axes. In one example, time is associated with the X-axis and a content metric is associated with the Y-axis. For example, an image with particular content taken at the beginning of the event can be located in the left-center of the graph whereas an image with disparate content taken toward the end of the event can be located in the upper-right quadrant of the graph.

In this manner, images with similar or identical metrics are located more proximate to one another within the data set 200 than images that are dissimilar. This proximity can increase commensurate with an increased similarity of metrics. In one example, a general purpose image similarity algorithm is utilized via a universal mixture model as set forth in Adapted Mixture Models for Image Retrieval and Categorization (U.S. Patent Publication Number 2009/0144033) incorporated in its entirety herein by reference. Images that have a similarity greater than a predetermined threshold are placed into a cluster. The data set 200 is comprised of four exemplary clusters 202, 204, 206 and 208. In one example, a similarity score is assigned to each image pair, wherein the clusters 202-208 are formed automatically based at least in part upon the similarity calculated via one or more algorithms.

As the metrics associated with each image relate to placement within the graph, the clusters 202-208 are formed from images adjacent to one another. The line of demarcation between one cluster and another is determined based at least upon the similarity of images as determined above. An image with equal similarity between images in two or more disparate clusters can be selected for one cluster over the rest based upon predetermined criteria. In one aspect, each cluster has a rule set that contains a metric hierarchy, which can be employed to determine images that are included and excluded from each cluster. In this regard, a first image that contains a higher ranked metric (e.g., quality) can be selected over a second image for inclusion in a cluster. Such a logic flow can be employed to define boundaries between clusters within the data set 200 and/or images to include in the data set 200 itself.

Figure 3:
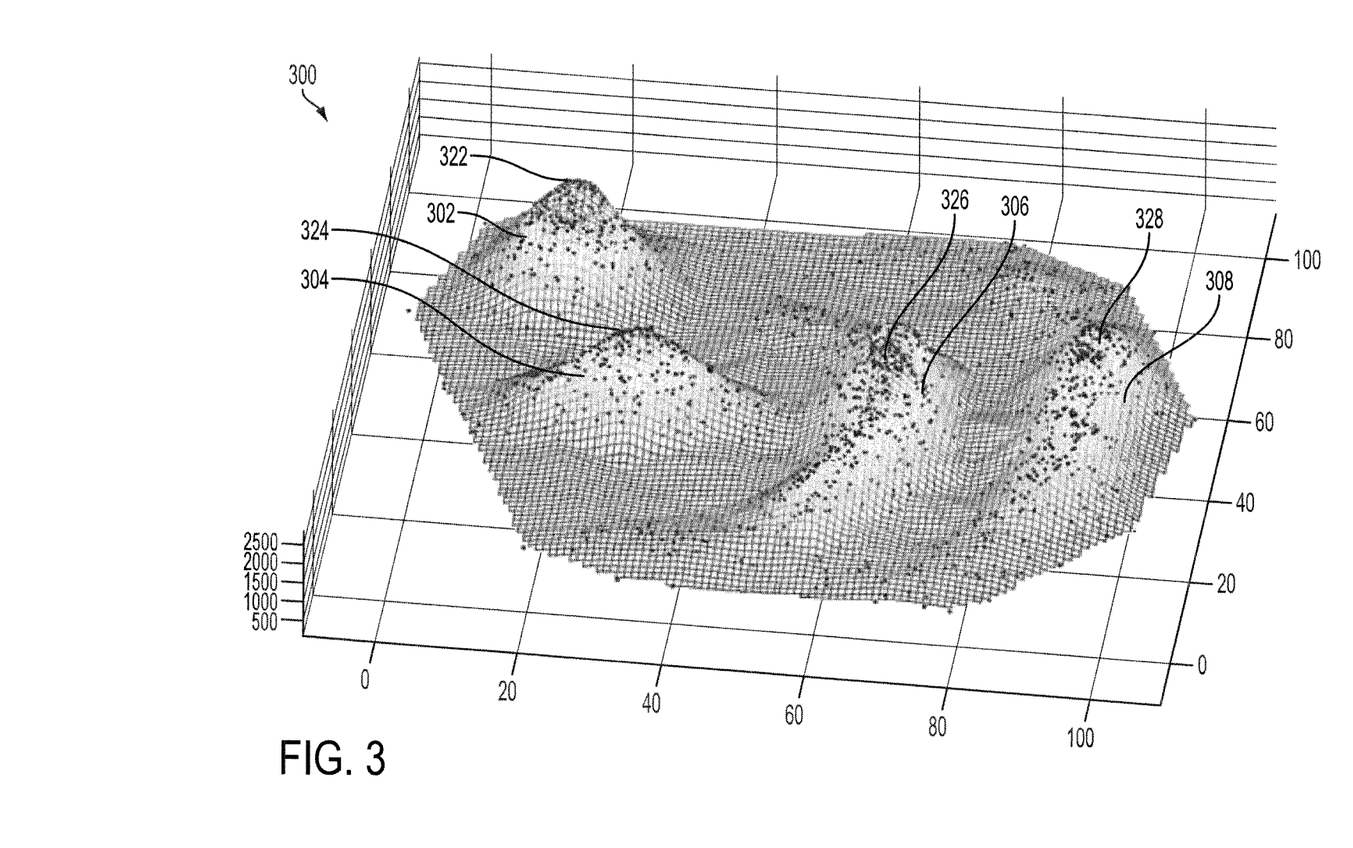
FIG. 3 illustrates a density estimation of the data set illustrated in FIG. 2, in accordance with an exemplary embodiment.

FIG. 3 illustrates a three-dimensional data set 300 generated via application of a density function to the data set 200. The data set 300 includes four hyperspheres 302, 304, 306 and 308 that correspond to the clusters 202, 204, 206 and 208 respectively. Each hypersphere has a local maximum value 322, 324, 326 and 328. Local maxima can be employed to identify a representative image from each hypersphere 302-308 to utilize for a compilation of images from the event.

In one aspect, each hypersphere 302-308 includes images from the clusters 202-208, wherein some content within the images is of higher frequency. The content of each image within a cluster can represent peak moments or particular environments that capture the attention of the event participants. The higher frequency of images that share these characteristics can generate a more dense and concentrated part in the image space within each cluster. The peaks 302-308 can then be identified via application of a density function to identify local maxima within the data set 200.

In one example, the event is a trip to Paris, wherein a plurality of captured images include the Eiffel Tower. During these "peaks" of the event, the pictures taken share several aspects as some variables remain constant throughout such as participants, buildings, scenario, general lighting conditions, etc. As many aspects are shared by all images within a cluster, the images therein are relatively interchangeable. Accordingly, a single image from each cluster can be identified to provide the content representative of the other images within the same cluster.

The density function can be estimated utilizing different methods, wherein each method identifies disparate results. Accordingly, the choice of the estimation of the density function should suit each addressed problem.

In one example, a k-nearest neighbor algorithm is applied to the data set 200 to identify the local maxima 322-328 contained therein. The k-nearest neighbor algorithm is a type of instance-based learning employed to classify images based on closest training examples within the data set 200. The function utilized to execute the algorithm is approximated locally wherein computation is deferred until classification of each image. The image can be classified by a majority vote of its neighbors (e.g., images that have many similar metrics), wherein the image is assigned to the cluster most common amongst its k nearest neighbors, wherein k is generally a small positive integer.

In one example, if k=1, then the image is assigned to the cluster of its nearest neighbor. In a binary classification problem, wherein two images are compared to one another, k can be selected as an odd integer to avoid tie votes. The best choice of k depends upon the data; generally, larger values of k reduce the effect of noise on the classification, but make boundaries between clusters less distinct. An appropriate k value can be selected via various heuristic techniques, such as cross-validation for example.

The neighbors are taken from a set of images for which the correct cluster classification is known. This can be used as the training set for the algorithm. In order to identify neighbors, the metrics and/or content associated with each image are represented by position vectors in a multidimensional feature space. For this purpose, Euclidean distance can be employed though other distance measures, such as the Manhattan distance are contemplated.

Thus, the exemplary images utilized for training are vectors in a multidimensional feature space. The space is partitioned into regions by locations and labels of the training sample images. A point in the space is assigned to a particular cluster if it is the most frequent label among the k nearest training samples. The training phase of the algorithm consists of storing the feature vectors and class labels of the training images. In the actual classification phase, the test image (whose class is not known) is represented as a vector in the feature space. Distances from the new vector to all stored vectors are computed and k closest samples are selected for inclusion in a hypersphere.

In one approach, the density of each image i within the data set 300 is defined utilizing methods set forth in the paper "A Density-based Algorithm for Discovering Clusters in Large Databases With Noise" by M. Ester, H. P. Kriegel, X. Xu, pp. 226-231, Proceedings of $2^{nd}$ ACM SIGKDD, Portland, Oreg., 1996. The density of i can be is defined as follows:

$$\text{dens}(i) = n(i)/V \quad (1)$$

where n(i) is the number of elements (e.g., content and metrics of each image) that fall in a hypersphere with a center at i and volume V. The density at one point can be estimated considering only a fixed radius. In another embodiment, a plurality of radii are utilized to obtain a smoother density estimation to better accommodate image similarity for a density function estimation. In particular, a predefined set of radii $\{r_1, \ldots, r_R\}$ of the hypersphere is utilized. This density estimation provides:

$$\text{dens}(i) = \Sigma_{h=1}^{R} n(i,h)/V(h) \quad (2)$$

where n(i,h) is the number of points that fall in the hypersphere with a radius of $r_h$ with a volume V(h). Applying equation (2) to the data set 200 generates the local maximum values 322, 324, 326 and 328 for each of the clusters 202, 204, 206 and 208 respectively. As discussed herein, the local maxima of a density function are considered modes (e.g., local agglomeration of points that generate a local maximum in the density function). The volumes V(h) can increase or decrease the number of modes computed and will depend each particular dataset. For example, hyperspheres with a relatively large radius can provide a smoother density function with few local maxima, wherein a small radius can provide a relatively larger number of local maxima. In this example, the number of high density regions and number of modes are both equal to four. It is to be appreciated, however, that the high density regions for a data set can vary to provide substantially any number of modes with an equal number of local maxima related to high density regions contained therein.

The density estimation and the modes detection provide a set of elements that represent the peaks within a given event. Using these elements to summarize the event, an adequate representation of the most interesting moments of the event can be obtained. Other aspects can be considered, including quality of each photo, ratings associated therewith and other related information that may be available for each image.

Figure 4:
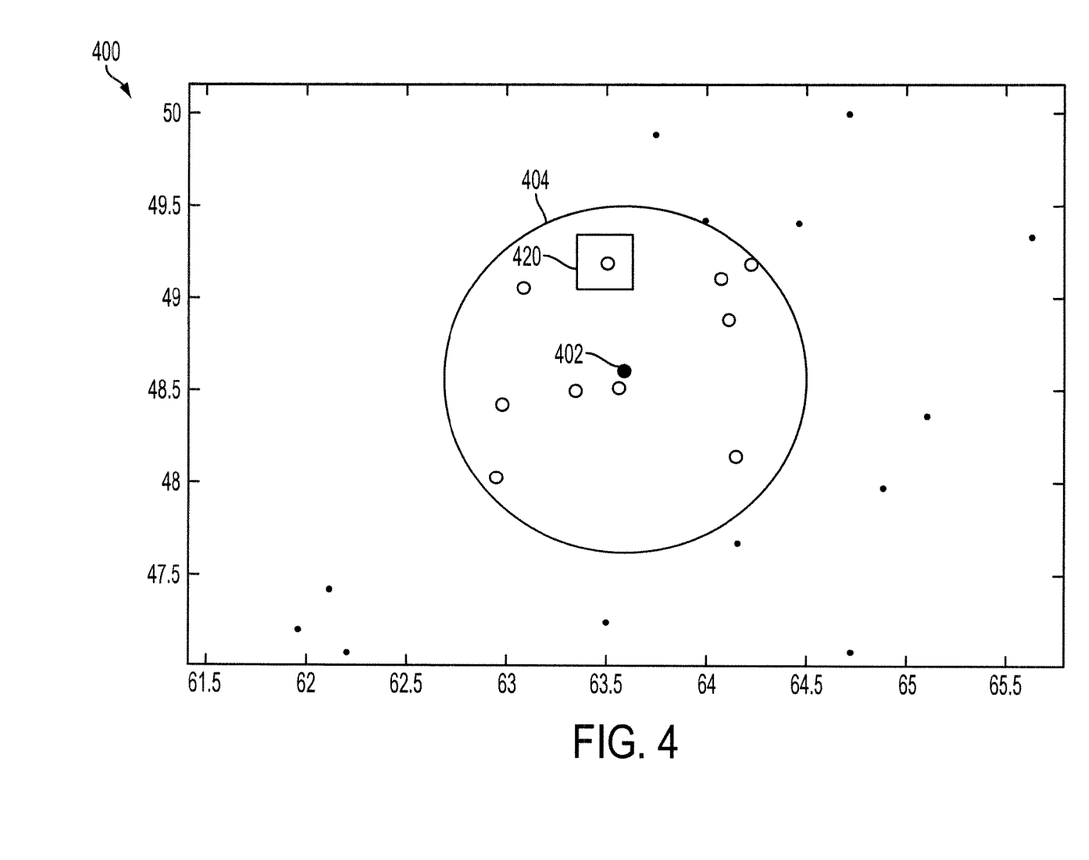
FIG. 4 illustrates mode detection and neighbor candidate selection of the density estimation set forth in FIG. 3, in accordance with an exemplary embodiment.

For each mode of the density function, only one image is selected within a closed neighborhood of the images representing the local maxima. In this example, each neighborhood is associated with a cluster 202, 204, 206 and 208. In one particular example, FIG. 4 shows a graph 400 wherein a local maximum point 402 is designated in the center of a data cluster 404. The cluster 404 is one of four modes illustrated in the data set 300. Accordingly, the cluster 404 defines the boundary of the neighborhood from which a peak representative 420 is selected.

Among each one of the small subsets extracted for each peak, only one representative is selected by considering one or more disparate features. Such features are utilized to promote or eliminate images in order to obtain a reduced ranked subset where the first subset is chosen as representative of the peak. Such disparate features can include image quality, timeline consistency of each image, a rating, associated downloads, etc. Image quality can relate to one or more of a sharpness, an exposure, a contrast and a similarity to a .jpg format for each image. A timeline consistency can require images to be captured within a predefined window of time. If some images are not within the predefined range, they are not considered as candidates. User provided ratings can be utilized as a criterion for image selection wherein evaluations that are rated positively will be associated with a higher priority. The number of downloads for each image can be utilized to help sort candidate images wherein the most visited images are associated therewith a higher ranking.

Figure 5:
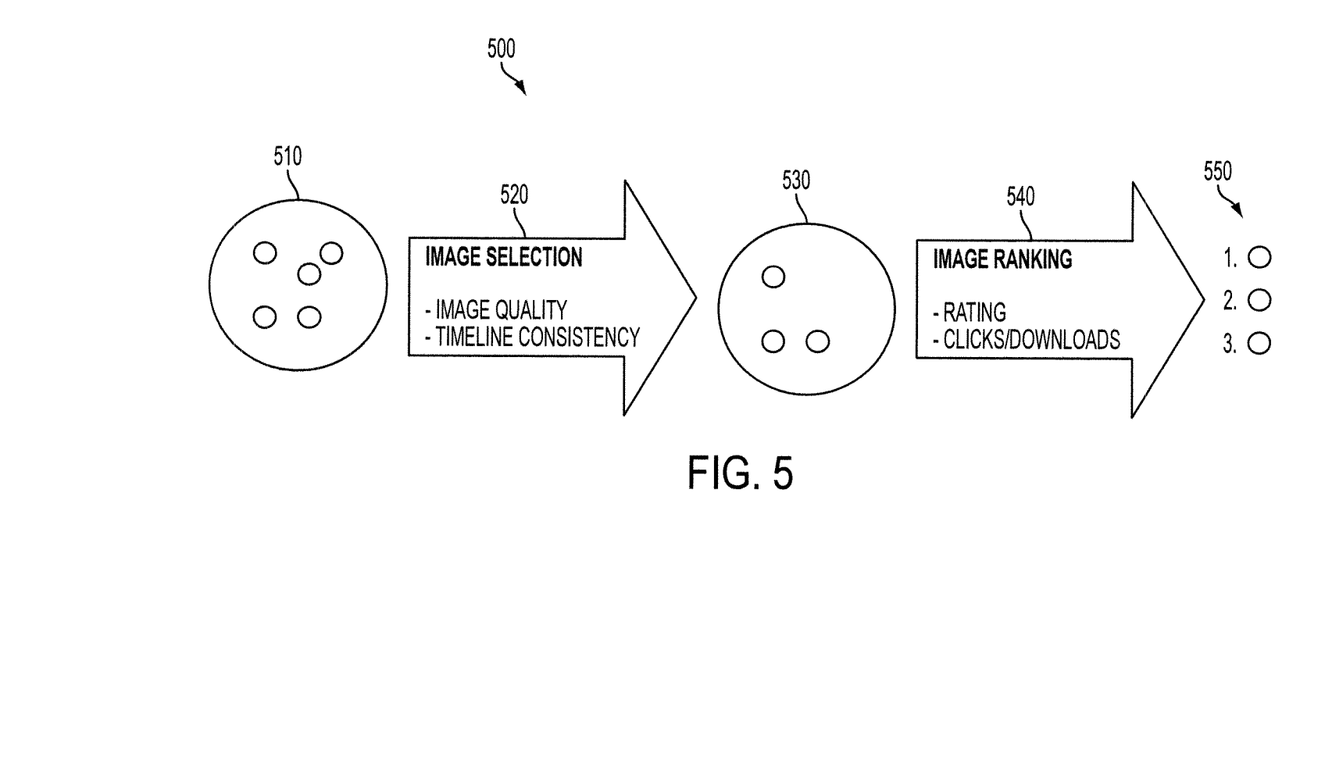
FIG. 5 illustrates a schema of a selection and ranking procedure for selection of a peak representative image from the data set, in accordance with an exemplary embodiment.

FIG. 5 illustrates a rules algorithm that can be applied to the image features to facilitate selection of one or more images for presentation. Metrics used by the algorithm can be provided via Exif metadata, user provided information, and/or image quality features using Automatic Image Enhancement software associated with each image, In one example, a two step process is employed as depicted in a schema 500. A first group 510 contains images that have disparate quality and time of capture metrics associated therewith. At 520, an image selection algorithm is applied to the images within the group 510, wherein poor quality images and images outside of a predefined time window are eliminated. A second group 530 contains images remaining after application of the image selection algorithm.

At 540, an image ranking algorithm is applied to the group 530. The image ranking algorithm ranks the remaining images based at least upon ratings from one or more users. A high rating can be associated directly by a user or inferred based on an activity such as the number of image downloads or clicks. A group 550 is created from application of the second algorithm to the group 530. The images within the group 550 are ordered, wherein images are placed from top to bottom commensurate with rank.

The image selection and image ranking algorithms can be modified and/or expanded to allow a user select one or more ranked images for inclusion within an album. Such criteria is not necessary to provide automatic generation of an event summarization but can be considered a last step of user refinement of the results. Further, other criteria can be considered including user based criteria, image analysis algorithms including facial detection and recognition. In this manner, a more diverse representation of participants in an event can be realized.

Figure 6:
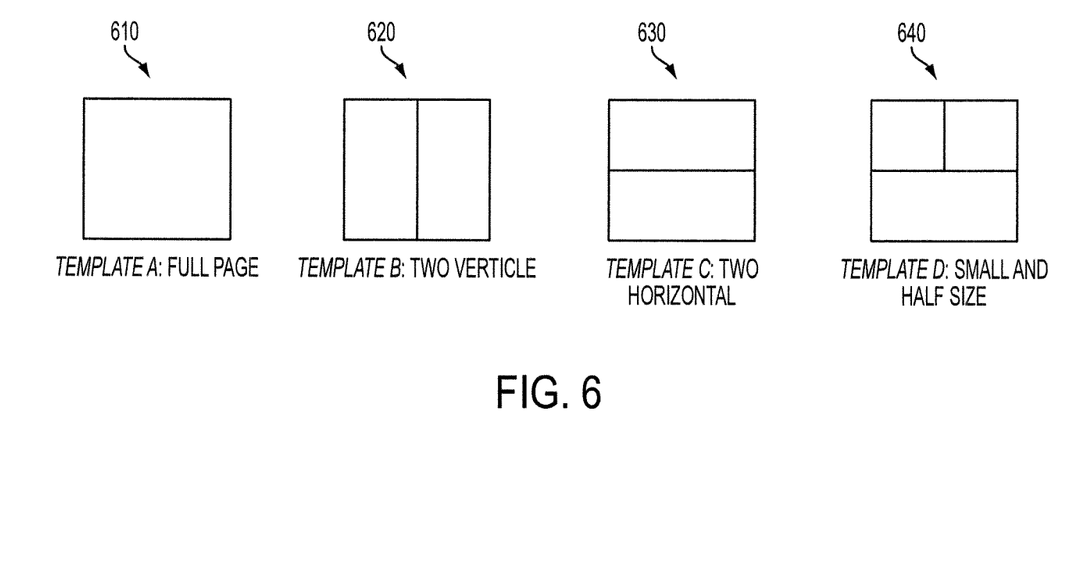
FIG. 6 illustrates a plurality of photo album layouts in which to port the images selected, in accordance with an exemplary embodiment.

FIG. 6 illustrates a plurality of templates 610, 620, 630 and 640 that represent a full page, two vertical areas, two horizontal areas, and a small and half size area respectively. The templates 610-640 are exemplary and can be utilized to facilitate layout generation for images obtained via the image selection and the image ranking algorithms. A simple categorization can be utilized to provide an estimated evaluation as to where a photo is best presented within a given layout.

Figure 7:
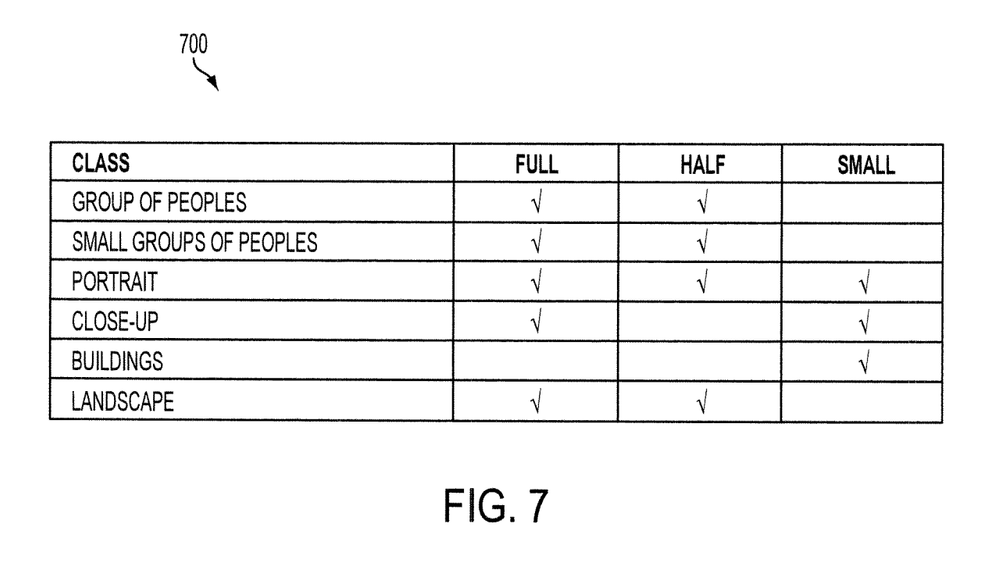
FIG. 7 illustrates criteria utilized to facilitate the selection of a particular layout, in accordance with an exemplary embodiment.

The categorization can be employed to assign macro characteristics of each selected image to best suit the layout. FIG. 7 illustrates categories that can be assigned to one or more images to facilitate layout distribution as set forth in the chart 700. In this manner, the selection of the appropriate template can relate to one or more criteria associated with each image. Such criteria includes images that contain a group of people, a small group of people, a portrait image, a close-up image, a building, a landscape, etc. It is to be appreciated that other approaches can be utilized to improve or adapt the layout generation to different event types. Further, rotation information for each image can be provided via metadata. Image sequence within an event summarization can be to respect as much as possible the global timeline. After the categorization step, each image can be assigned to a particular spot on the layout considering the time associated with each image.

FIG. 8 illustrates a methodology 800 to select images for placement within a layout based on predetermined criteria. At reference numeral 810, a data set of images is received from an outside source such as a storage device. The images a grouped into clusters at 820. Inclusion into a cluster can be related to the similarity of other images within the data set. A density estimation is applied to the clustered images at 830 to identify local maxima associated with each cluster. Such maxima can correspond to images that contain content that is provided in one or more other images within the same cluster.

At 840, at least one image is select from each cluster. The one or more images selected can be associated with the maximum value from the density estimation can be representative of the other images within the same cluster. In this manner, redundancy of image content is avoided. Images can also be eliminated from selection if one or more metrics (e.g., image quality, time of image capture, etc.) does not meet a predetermined threshold. The images are ranked at 850 based upon substantially any metric such as third party rating of the image relative to other images. At 860, a layout is created for presentation of the ranked images. In one approach, the image placement within the layout is commensurate with the rankings associated therewith.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for generating an album describing an event, the method comprising:
   receiving a plurality of images in an image data set;
   evaluating a similarity of images based on one or more metrics associated with each image;
   creating a cluster of images having a similarity score greater than a predetermined threshold;
   identifying local maximum within the data set via a density function;
   using each local maximum to identify an element representing a peak moment within a given event;
   selecting one image within each closed neighborhood of images representing the local maximum by considering one or more disparate features, the disparate features including at least one of image quality, time of capture, user-rating, and ranking;
   selecting a template for laying out the selected images, the selecting related to criteria associated with each image;
   assigning the each image to the template based on a time associated with the each image; and,
   presenting the selected images in the layout.

2. The method according to claim 1, wherein the identifying includes:
   estimating a density value of each cluster using a k-nearest neighbor function.

3. The method according to claim 1, wherein the selecting the one image by considering the one or more disparate features includes:
   rating the images based on at least one of a quality of image, a time of image capture, and image content.

4. The method according to claim 3, wherein the selecting the one image by considering the one or more disparate features includes, receiving a rating for the each image provided directly by one or more users for each image and/or calculated based on the number of downloads from the website.

5. The method according to claim 3, wherein the selecting the one image by considering the one or more disparate features includes:
   ranking the selected images based at least in part upon a user-rating received for the each image.

6. The method according to claim 5, wherein the placement of the images within the layout is based at least in part upon the ranking of each image.

7. A method to provide a representative compilation of images from an event, comprising:
   receiving a plurality of images in an image data set;
   evaluating a similarity of images based on one or more metrics associated with each image;

determining a density of each image within the data set using the equation, $\text{dens}(i) = \Sigma_{h=1}^{R} n(i,h)/V(h)$, wherein n(i) is a number of points that fall in a hypersphere with a radius of $r_h$ with a volume V(h);

identifying a local maximum for each hypersphere within the data set using the density;

using each local maximum to identify an element within the images representing a peak moment within a given event;

selecting one image within each closed neighborhood of images representing the local maximum by considering one or more disparate features;

creating a layout for presenting the selected images; and, presenting the selected images in the layout.

8. The method according to claim 7, wherein the creating the layout includes:

placing the images within the layout based upon at least one of size, quality, content and ranking.

9. The method according to claim 7, further including:

after receiving the plurality of images, placing each image in a cluster wherein each image within a cluster has a similarity greater than a predetermined threshold.

10. The method according to claim 9, wherein computing the density estimation is performed within each cluster.

11. The method according to claim 10, wherein the local maximum values associated with images in each cluster are selected.

12. The method according to claim 7, further including:

rating the images based on at least one of a quality of image, a time of image capture, and image content.

13. The method according to claim 7, further including:

ranking the selected images based at least in part upon the rating of each image.

14. A system that identifies images for presentation within a compilation, comprising:

an image data set that contains a plurality of images;

a similarity evaluator that receives the image data set, determines a similarity score for each image relative to every other image within the data set and assigns each image to a cluster based on the similarity score;

a density estimator that identifies local maximum within the data set via a density function and uses each local maximum to identify an element representing a peak moment within a given event;

an image selector that selects one image within each closed neighborhood of images representing the each local maximum by applying at least one of an image selection algorithm for eliminating images not captured within one of a predefined window and a ranking algorithm for ranking remaining images; and, a layout creator for placing the selected images in a template.

15. The system according to claim 14, wherein the similarity score is determined based on a universal mixture model algorithm.

16. The system according to claim 14, further including:

a rules store that provides criteria for image selection via the image selector, the rules store contains parameters that relate to one or more of image quality, timeline consistency, image rating, and image downloads.

17. The system according to claim 14, further including:

a rating module that assigns a rating score to each selected image based at least in part upon a quality of image, a time of image capture, and image content.

18. The system according to claim 14, further including:

an image ranker that ranks the images from best to worst, based at least in part upon the rating score.

19. The system according to claim 14, further including:

wherein the layout creator adapted to:

receive a category assigned to each image;

select the template for laying out the remaining images, the selecting related to criteria associated with each image;

estimate a region where the each image is best presented within the template using the category;

assign the each image to a spot in the region of the template based on a time associated with the each image; and, present the each image in the layout.

\* \* \* \* \*